United States Patent [19]

Munns

[11] 4,250,655
[45] Feb. 17, 1981

[54] RODENT OR VERMIN TRAP

[76] Inventor: Rupert H. Munns, Gogango, via Rockhampton, Queensland, Australia, 4702

[21] Appl. No.: 50,634

[22] Filed: Jun. 21, 1979

[30] Foreign Application Priority Data

Jun. 26, 1978 [AU] Australia ............... PD4859

[51] Int. Cl.³ ............................................. A01M 23/38
[52] U.S. Cl. ....................................................... 43/99
[58] Field of Search ................................... 43/98, 99

[56] References Cited

U.S. PATENT DOCUMENTS

| 1,034,978 | 8/1912 | Christman | 43/99 |
|---|---|---|---|
| 1,074,770 | 10/1913 | Beardsley | 43/99 |
| 2,218,403 | 10/1940 | McKee | 43/99 |
| 2,229,300 | 1/1941 | Montroy | 43/98 |
| 2,398,188 | 4/1946 | Meehan | 43/99 |
| 2,411,766 | 11/1946 | Vincent | 43/99 |
| 2,519,783 | 8/1950 | Nagl | 43/99 |
| 3,007,277 | 11/1961 | Anderson | 43/99 |

FOREIGN PATENT DOCUMENTS 946398 1/1964 United Kingdom .
1301130 12/1972 United Kingdom .

*Primary Examiner*—Nicholas P. Godici
*Attorney, Agent, or Firm*—Schwartz, Jeffery, Schwaab, Mack, Blumenthal & Koch

[57] ABSTRACT

A rodent or vermin trap is provided which has a chamber, an entrance to the chamber and bait means located in the chamber. There is included at least two spaced electrodes between the entrance and the bait means which are adapted to be raised to an electrical potential to supply a shock to rodents or vermin entering the chamber.

8 Claims, 3 Drawing Figures

RODENT OR VERMIN TRAP

BACKGROUND OF THE INVENTION

This invention relates to a rodent or vermin trap which is suitable to trapping or killing rats and mice.

DESCRIPTION OF THE PRIOR ART

Over the years, many forms of rodent traps have been devised including the bottle-over-the-water-bucket trap, and the common spring-loaded mouse trap. These traps have had many disadvantages. For example, the common mouse trap must be reset each time a mouse is caught, and the mice can sometimes retrieve the bait without being tapped.

SUMMARY OF THE INVENTION

An object of the present invention is to provide a trap which is suitable for catching large numbers of rodents or vermin which does not require regular resetting.

A preferred object of the present invention is to provide a trap which is suitable for use in areas where food is stored e.g. in warehouses, bakeries, storerooms. A further preferred object is to provide a trap where the rodent or vermin suffers an electrical shock, which may either stun or kill.

A further preferred object is to provide a trap which is simple to set up, check and empty.

Other preferred objects of the present invention will become apparent from the following description.

In the broad aspect the invention resides in a rodent or vermin trap including:
  a chamber;
  an entrance to said chamber;
  bait means in said chamber; and
  at least two spaced electrodes between said entrance and said bait means, said electrodes being adapted to be raised to an electrical potential to supply a shock to rodents or vermin entering the chamber.

Preferably the trap further includes a floor in said chamber, said bait means and said electrodes being spaced above said floor and a trap entrance spaced from said chamber and a passageway connecting said trap entrance to said chamber entrance.

Preferably, the passageway has an upwardly inclined floor and inwardly inclined walls from said trap entrance in the direction of said chamber entrance and second bait means are provided adjacent said trap entrance to lure rodents or vermin into said passageway.

Preferably the chamber is earthed, one electrode is connected to a neutral or negative line and the other electrode is connected to an active or positive line of an electrical supply, which may have a potential in the range 12 volts to 5000 volts (preferably 240 volts), with either alternating or direct current.

Preferably the chamber is closed by a removable cover plate wherein the bait means includes a box depending from said cover plate, a mesh screen in the end of the box adjacent said electrodes, and a closable aperture in said cover plate to enable bait to be positioned in said box from the exterior of said chamber.

Preferably the trap further includes a second chamber spaced from said chamber by a dividing wall, a passage connecting said chamber to said second chamber and one-way door means in said passage adapted to only allow movement from said chamber to said second chamber.

Preferably the trap further includes a discharge means connected to said second chamber and an inspection cover closing said second chamber.

BRIEF DESCRIPTION OF THE DRAWINGS

To enable the invention to be fully understood, a preferred embodiment will now be described with reference to the accompanying drawings, in which.

DESCRIPTION OF THE PREFERRED EMBODIMENT

Figure 1:
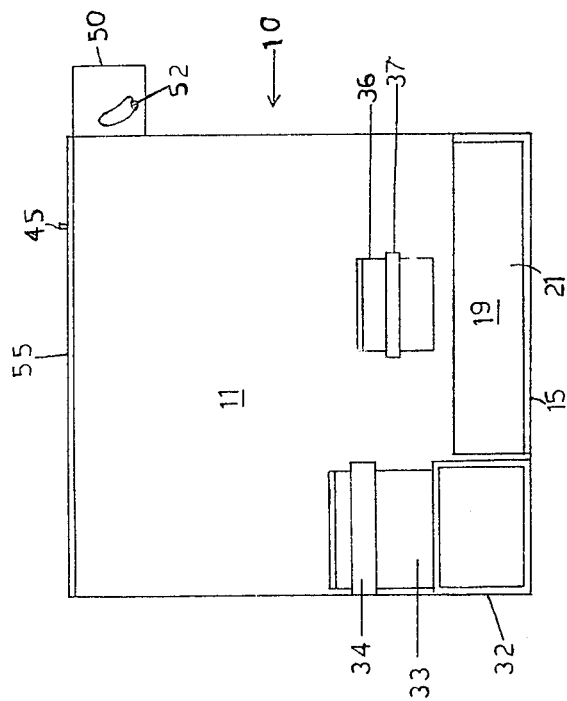
FIG. 1 is a front view of the trap.
Figure 2:
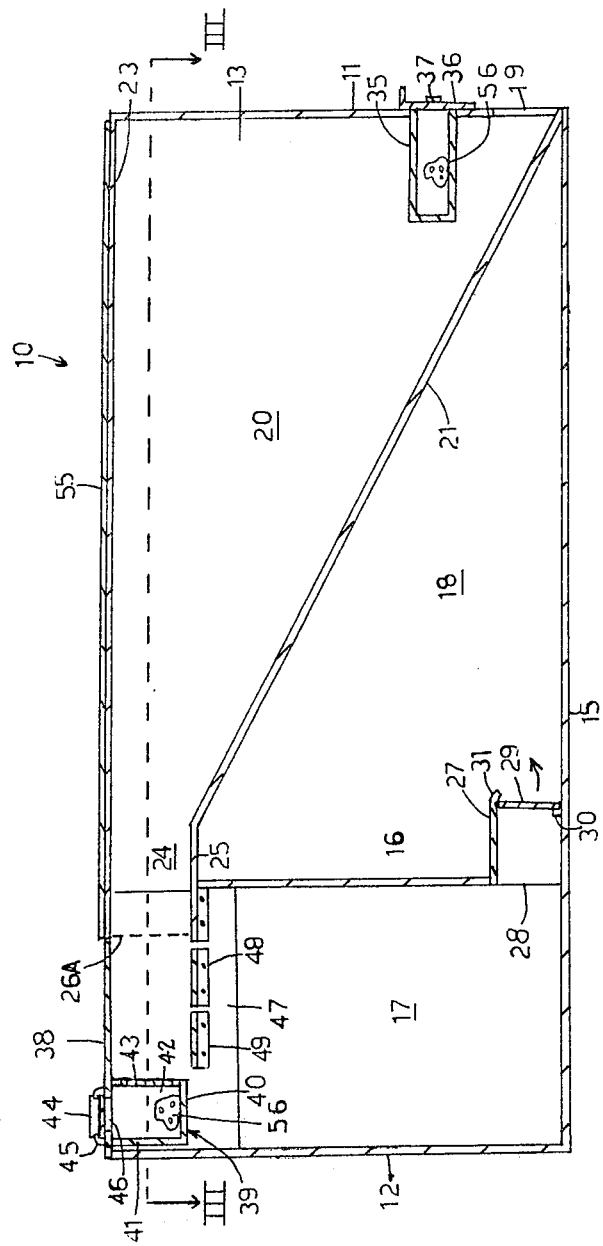
FIG. 2 is a sectional side view taken on line II—II on FIG. 3.
Figure 3:
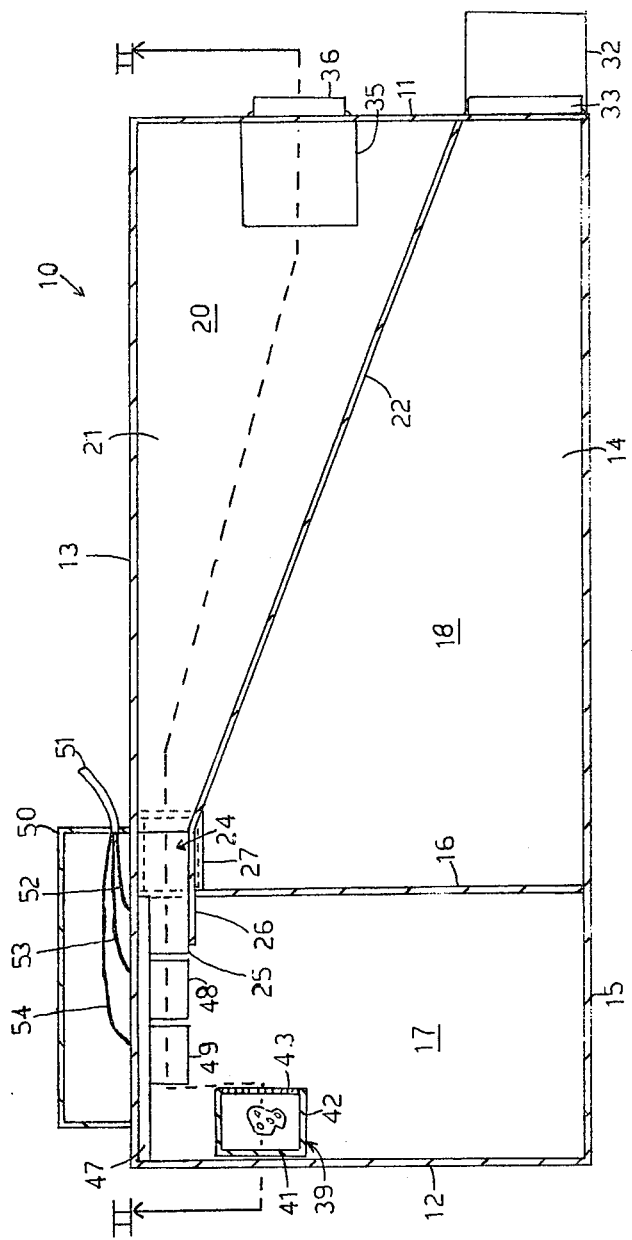
FIG. 3 is a sectional plan view taken on line III—III on FIG. 2.

The trap has a body 10 having a front wall 11, rear wall 12, side walls 13, 14 and a floor 15. A dividing wall 16 separates the shock chamber 17 from the holding chamber 18.

A rectangular entrance hole 19 is formed in the lower portion of the front wall 11 and extends approximately two-thirds of the width of the wall. The hole 19 provides communication to a passageway 20 formed by an inclined ramp floor 21, angled side wall 22, side wall 13 of the body 10, and a passageway roof 23.

The passageway 20 is in communication with a passage 24 which passes through the dividing wall 16. The passage 24 has a floor 25 and side walls 26 continuous with the ramp floor 21 and angled side wall 22 respectively. The side wall 26 continues into the shock chamber 17 to the position indicated by the dashed line 26A.

An escape passage 27 is provided between the shock chamber 17 and the holding chamber 18. The passage 27 is in communication with a hole 28 in the dividing wall 16. A one-way hinged door 29 is provided at the other end of the passage 27. A stop 30 prevents the door 29 from swinging into the passage 27, while a downturned flange 31 limits the angle of opening of the door 29 into the holding chamber 18.

A discharge chute 32 is extended from the front wall 11 and the communication of the chute 32 with the holding chamber 18 is controlled by a sliding door 33 supported by a guide 34. A dummy bait-box 35 is mounted on the rear face of the front wall 11 and extends into passageway 20. The front of the bait box 35 is closed by a sliding door 36 mounted on guides 37. A removable cover plate 38 closes the shock chamber 17. The main bait box 39 is provided on the lower face of the cover plate 38 and has a floor 40, a rear wall 41 and side walls 42. The front of the bait box 39 is provided with a wire mesh screen 43. A sliding door 44, carried in guides 45, allows communication to the interior of the bait box 39 via hole 46 in the cover plate 38.

An insulating block 47 is fixed to the side wall 13 of the trap body. A pair of electrodes 48, 49 are mounted on the block 47, insulated from the tray body 10, at the same level as the floor 25 of passage 24.

A removable box 50 is mounted on the outside face of the side wall 13 opposite the insulating block 47. An electrical cable 51, enters the box 50. The earth wire 52 of the cable 51 is connected to the floor 25, while the neutral wire 53 and active wire 54 are connected to electrodes 48, 49 respectively.

An inspection cover 55 is hingedly mounted on the side wall 14 of the trap body 10 to cover the holding chamber 18.

The operation of the trap will now be described.

The operator places the trap in a suitable position, places bait 56 e.g. cheese, bacon, in the dummy bait box 35 and main bait box 39, connects the cable to a suitable electricity supply e.g. the 240 volt. A.C. mains, and switches on the electricity.

As electrodes 48, 49 are connected to the neutral wire 53 and active wire 54, they have a 240 volt potential across the air space between them.

The mouse is attracted by the aroma of the bait. When he finds that he cannot get at the bait in the dummy bait box 35, he enters the entrance hole 19 and proceeds up the inclined ramp floor 21 (along passageway 20) towards the bait 56 in the main bait box 39. When he enters passage 24, he cannot turn around. Still attracted by the bait 56, which he can now also see through the mesh screen 43, the mouse steps from the floor 25 (which is at ground potential being connected to the ground by wire 52 of the main supply) onto electrode 48, and then electrode 49. When his front legs are on electrode 49 and his rear legs are on electrode 48, he receives a 240 volt shock which throws him down onto the floor 15 of the shock chamber 17.

If the shock kills the mouse, he remains where he lands. However, it is more usual that the electrical shock merely stuns the mouse. When he recovers, the mouse tries to find his way out of the shock chamber 17. He enters the hole 28 in dividing wall 16 and moves along the passage 27. Pushing on the hinged door 29, he then moves into the holding chamber 18, from which he cannot escape as sliding door 33 and the inspection cover 55 are closed and the hinged door 29 cannot be pushed open against the stop 30. The mouse then starves to death.

Periodically, the operator turns to the trap to change the bait 56 and to empty the holding chamber 18 of dead mice. To empty this chamber, the operator places the discharge chute 32 above an empty container, opens the sliding door 33 and tilts the trap to cause the dead mice to fall out of the trap. The operator can raise the inspection cover to ensure that the holding chamber 18 is empty.

As the rodents or vermin never gain access to the bait 56, this only has to be replaced periodically.

To check the shock chamber 17, the cover plate 38 can be removed. As the shock chamber 17 contains the electrodes 48, 49, the cover plate 38 is held in place by positive fasteners e.g. screws, bolts, to prevent the operator accidentally opening the chamber and receiving an electrical shock himself.

In certain applications, it may be preferred to have the electrodes 48, 49 connected to the secondary side of an isolating transformer, which may be a step-down transformer (e.g. 240 V to 32 volts) or a step-up transformer (e.g. 240 V to 5000 volts). A safety fuse may be provided to protect the electrical circuit should a fault occur. Alternatively, the transformer may be replaced by a half-wave or full-wave rectifier.

As an alternative form of arranging the electrodes, electrode 49 may be placed above electrode 48 so that the mouse tries to walk between them to reach the bait 56 in the main bait box 39 but is stunned by the high potential (e.g. 1000-5000 volts across the airgap between the electrodes).

To enable the trap to be easily moved from one position to another, suitable carrying handles may be provided.

In a further modified arrangement, the floor 15 of the shock chamber 17 may be omitted, and the chamber may be placed over a container filled with water so that the stunned rodents or vermin fall into the water and drown. This arrangement avoids the need for the holding chamber 18, passage 27 and discharge chute 32.

The dummy bait box 35 may be omitted but it is preferably retained to assist in drawing the rodent to the front of the trap and thereby to induce him to enter entrance hole 19.

Various other changes and modifications may be made to the arrangement described without departing from the scope of the present invention.

I claim:

1. A rodent or vermin trap including:
a chamber;
a floor in said chamber;
a roof on said chamber;
an entrance to said chamber adjacent said roof;
a trap entrance spaced from said chamber;
a passageway connecting said trap entrance to said chamber entrance, the passageway having an upwardly inclined floor and an inwardly inclined wall in the direction of said chamber entrance;
a first bait means in said chamber adjacent said roof;
at least two spaced electrodes between said chamber entrance and said first bait means, said electrodes being insulated from said chamber and adapted to be raised to an electric potential to cause rodents or vermin entering said chamber to receive an electrical shock and fall to said chamber floor; and
a second bait means disposed adjacent said trap entrance to lure rodents or vermin into said passageway.

2. A trap as claimed in claim 1 wherein:
said chamber is grounded;
one of said electrodes is connected to a neutral or negative line of an electrical supply; and
another electrode is connected to an active or positive line of an electrical supply.

3. A trap as claimed in claim 1 wherein:
the electrical potential across said electrodes is in the range of 12 volts to 5000 volts, alternating current or direct current.

4. A trap as claimed in claim 3 wherein:
the electrical potential is 240 volts alternating current.

5. A trap as claimed in claim 1 and further including a removable cover plate closing said chamber, and wherein:
said first bait means includes a box depending from said cover plate, a mesh screen in the end of the box adjacent said electrodes, and a closable aperture in said cover plate to enable bait to be positioned in said box from the exterior of said chamber.

6. A trap as claimed in claim 1 and further including:
a second chamber spaced from said chamber by a dividing wall;
a passage connecting said chamber to said second chamber; and
one-way door means in said passage adapted to only allow movement from said chamber to said second chamber.

7. A trap as claimed in claim 6 and further including:
discharge means connected to said second chamber; and
an inspection cover closing said second chamber.

8. A trap as claimed in claim 1 wherein said second bait means is sealed from the interior of said passageway.

* * * * *